US006748305B1

(12) United States Patent
Klausner et al.

(10) Patent No.: US 6,748,305 B1
(45) Date of Patent: Jun. 8, 2004

(54) METHOD AND DEVICE FOR STORING DATA IN A VEHICLE AND FOR EVALUATING SAID STORED DATA

(75) Inventors: Markus Klausner, Pittsburgh, PA (US); Michael Baeuerle, Markgroeningen (DE); Klaus Ries-Mueller, Bad Rappenau (DE); Wolfgang Grimm, Allison Park, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,922

(22) PCT Filed: Mar. 25, 2000

(86) PCT No.: PCT/DE00/00922

§ 371 (c)(1), (2), (4) Date: Jan. 2, 2002

(87) PCT Pub. No.: WO00/60547

PCT Pub. Date: Oct. 12, 2000

(30) Foreign Application Priority Data

Mar. 31, 1999 (DE) ........................................ 199 14 764

(51) Int. Cl.[7] ............................ G06F 19/00; G07C 5/08

(52) U.S. Cl. ............................ 701/35; 701/30; 702/34; 702/182; 340/438

(58) Field of Search .............................. 701/29, 30, 31, 701/32, 34, 35; 702/34, 182; 340/438

(56) References Cited

U.S. PATENT DOCUMENTS 4,267,569 A * 5/1981 Baumann et al. ............. 701/99
4,843,557 A 6/1989 Ina et al. ...................... 701/29
5,732,676 A * 3/1998 Weisman et al. ........... 123/436
5,857,159 A * 1/1999 Dickrell et al. ............... 701/35
5,964,813 A * 10/1999 Ishii et al. ..................... 701/35
6,172,602 B1 * 1/2001 Hasfjord ..................... 340/438
6,301,531 B1 * 10/2001 Pierro et al. .................. 701/29
6,516,256 B1 * 2/2003 Hartmann et al. ............ 701/35

FOREIGN PATENT DOCUMENTS

| | | |
|---|---|---|
| DE | 44 43 218 | 4/1996 |
| DE | 195 16 481 | 11/1996 |
| DE | 195 46 815 | 6/1997 |
| DE | 297 23 097 | 5/1998 |
| DE | 197 00 353 | 7/1998 |
| EP | 0 671 631 | 9/1995 |
| EP | 0 863 490 | 9/1998 |
| EP | 0 871 147 | 10/1998 |

* cited by examiner

*Primary Examiner*—Tan Q. Nguyen
(74) *Attorney, Agent, or Firm*—Kenyon & Kenyon

(57) ABSTRACT

A device and a method for storing and/or analyzing data in a memory in a motor vehicle is described, the data being transmitted in the vehicle over a data bus to which are or can be connected components such as vehicle systems, sensors, actuators and other vehicle components. The memory is designed as a central memory medium for the components connected to the data bus, and it is also connected to the data bus in the vehicle. The data is stored permanently in the memory medium for the entire service life of the vehicle. In addition, the data is interpreted by analyzing arrangements connectable to the memory medium, preferably in such a manner that a measure of the usage and/or wear of the vehicle and/or its components is obtained.

24 Claims, 4 Drawing Sheets

METHOD AND DEVICE FOR STORING DATA IN A VEHICLE AND FOR EVALUATING SAID STORED DATA

FIELD OF THE INVENTION

The present invention relates to a device and a method of storing and/or analyzing data in a vehicle.

BACKGROUND INFORMATION

An arrangement for storing data in a motor vehicle is known from European Published Patent Application No. 0 671 631, for example, where the data includes static information on the motor vehicle and the owner and information on error codes regarding the status of systems, components and sensors on board the vehicle. The memory medium provided there is a card. This document describes the storage of error codes obtained on board a motor vehicle by an automotive diagnostic device. These error codes are stored on a smart card used in a suitable recording unit. Together with the error codes obtained on board, the card stores the position of the vehicle and information regarding the vehicle and its owner. The card can be removed from the recording unit and, since it contains its own intelligence and is equipped with separate devices, it can then be inserted into a telephone to relay the data to a mobile repair service. The smart card used and described here contains only information on an instantaneous error problem, so that all other information concerning the previous life cycle of the vehicle, i.e., previous error problems, is lost. This known arrangement thus does not permit storage of all the error codes obtained on board a given vehicle over its entire service life. In addition, there is no internal data analysis here which would make it possible to reconstruct individual usage and load patterns in particular.

German Published Patent Application No. 197 00 353 describes a device and method for diagnosis, control, transmission and storage of safety-relevant system status variables of a motor vehicle. It describes the acquisition of dynamic operating data on a motor vehicle for detection and evaluation of safety-critical situations. Control operations are derived from the data currently stored in the memory. According to the aforementioned document, process data, safety characteristics and control operations are recorded, and the recorded values are evaluated to analyze the course of risk situations and the behavior of the drivers over certain periods of time, in certain traffic situations and traffic regions in order to draw safety-relevant conclusions from this information for designing the driver-vehicle-environment system, so it can be assumed that in this document data is recorded in the vehicle only over a certain period of time and then is overwritten by more recent data. This document does not mention storage of data over the entire life cycle or a lengthy period of use of a vehicle. This related art publication also does not mention analysis of the data in order to compile usage and load patterns to determine the degree of wear, for example.

Storage of important data in the life history of a controller is described in German Published Patent Application No. 195 16 481. Data compiled and stored there can be output if necessary and thus provides a basis for evaluating the reliability of a used controller and the probability of its failure. This does not give an overall view of the vehicle in which the controller is installed, for example. This is also supported by the fact that the compiled and stored data, operating time, controller temperature and voltage values applied to the controller, in particular the duration and intensity of any interference voltages, show a direct physical correlation with one another and with the functionality of the controller itself. Due to the controller installed in the vehicle, storage and analysis of dynamic data, specifically internal or external reconstruction of individual usage and load patterns at any time are not shown, since only important data is stored. Therefore, it is impossible to consider and analyze non-correlating data or in particular to compile wear profiles for a vehicle.

In comparison with this related art, the object of the present invention is thus to compile, classify and store dynamic data, even uncorrelated data, over the entire life cycle of a vehicle or for a period of use and to reconstruct the use of and/or wear on a vehicle between its initial operation and any desired readout time, this being possible on a permanent basis through individual data interpretation.

SUMMARY OF THE INVENTION

The device and methods according to the present invention for storing and analyzing data in a vehicle permit input of all data relevant for the vehicle, its operation and its owner over the entire life cycle of the vehicle in a central memory which is connected to the data bus of the vehicle and is provided for that vehicle in a manner which is advantageous in comparison with the related art. This makes it possible to use this data in manifold and surprising ways.

Compilation, classification and storage of dynamic data during the use phase of a motor vehicle over its entire life cycle or service life is implemented according to the present invention in a system having a memory medium. This system in the form of an operating data memory which has at least one memory, a bus coupling and an input/output unit is referred to below as a memory medium. This memory medium is used for storing and processing pieces of information which are actually uncorrelated in their totality but their combination permits a detailed reconstruction of the vehicle usage and wear as well as vehicle loads between initial operation and any desired readout time. The memory medium is advantageously designed as a bus device and thus can input and analyze data on the data bus in an information network of vehicle components and systems and can request data from the bus devices for storage and reconstruction.

However, the type and intensity of vehicle usage, in particular individual vehicle load patterns, are known when the sensor data, which is already available in the vehicle, data from additional systems in the vehicle as well as data from other vehicle components are sent for additional analysis. Thus, the vehicle-specific load pattern or wear is an objective indicator in determining the residual value and condition of a vehicle.

It is also advantageous if data is recorded in encoded form with the help of a microprocessor. This also makes it possible to prevent manipulation of data, such as resetting the odometer.

Data stored in the memory medium also advantageously permits at any time reconstruction of individual usage and load patterns since the initial operation of a vehicle. This information can also be retrieved directly without any additional effort, even by the driver or owner of the vehicle, since the load pattern can be generated or reconstructed on site, i.e., in the vehicle itself.

Preferred use scenarios in which the device according to the present invention and the respective methods can be used advantageously are described below.

In the event of repair or service, components to be replaced can be easily identified on the basis of the hours of operation and the load. If critical conditions such as an overload occur in individual components, a detailed data record and analysis are possible. It is thus possible to adapt service intervals and repairs to the actual usage and load history of the vehicle and thus to determine both the usage history and the overall condition of the vehicle. Data in the memory medium may also be used for fault diagnosis.

When vehicle components are replaced or new components are installed, this can also be detected along with their repair history. In an advantageous manner, new vehicle components such as control units, sensors, in particular intelligent sensors, deliver an individual identifier the first time the vehicle is started up after these components are installed, and this code can also be detected and processed in the memory medium.

On the basis of the preceding discussion warranty, insurance and fairness claims can be made dependent on actual vehicle usage.

In renting and leasing vehicles, the lease price need no longer be determined on the basis of the lease period, but instead can be calculated on the basis of actual vehicle usage. It is thus possible to eliminate the extra risk surcharge for uncertainty regarding intensity of use during the lease period.

Even when selling a leased vehicle or a used car in general, such a memory medium would allow determination of an objective resale value depending on the intensity of previous use. Here again, an additional risk premium could be eliminated.

Improved management of a fleet of vehicles would thus also be possible through a knowledge of the actual up-to-date status of the fleet of vehicles. Specifically, this would permit scheduling of repairs, replacement of components, leasing and sale of vehicles.

Likewise, a decision could be made regarding possible recycling of a vehicle at the end of its service life, depending on a central memory medium. Reusable components can be identified and used again on the basis of their remaining service life.

Another advantageous area for use of the present invention is in automotive development. Specifications can be compared there with actual use data and adjusted accordingly. The memory medium supplies data on the field performance of components and the vehicle as a whole. Thus data for automotive development and component development can be obtained from the field. Possible recording of the driver's performance for test purposes and for development and designing vehicle components or vehicles for use in pre-production series is also possible through the central memory medium. This compilation of the driver's performance and of certain usage profiles can also be used to adapt vehicle performance to different driving styles.

DETAILED DESCRIPTION

Figure 1:
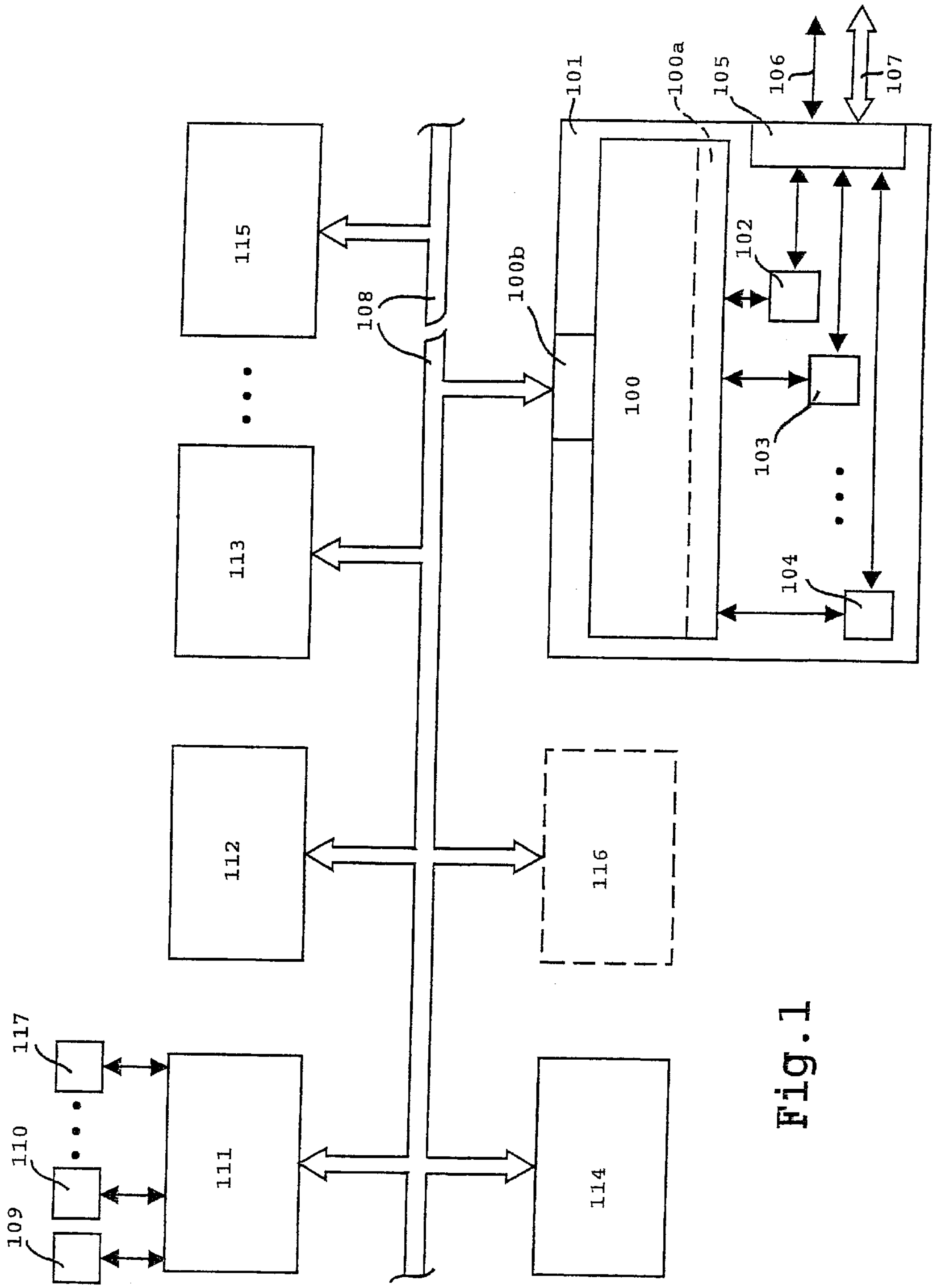
FIG. 1 shows a data bus in a vehicle, with various systems and sensors and other vehicle components connected to this data bus. The memory medium is also connected to the data bus.

FIG. 1 shows schematically in a block diagram an overall system having a data bus 108 which is provided in a motor vehicle. Memory medium 101 and various components 111 through 116 are connected to this data bus 108 within the vehicle. Components connected to the data bus may be individual systems, other control units, individual sensors or groups of sensors, actuators and other vehicle components. In this embodiment, a motor management system 111 also has sensors 109 and 110 and actuator 117 connected to it. This connection of sensors and actuators to the system may take place through separate connecting lines or serially or it may also use data bus 108 or some other bus system connected to data bus 108, in particular a field bus system. Sensors and/or actuators may be linked together by at least one second bus system, which may be designed as a field bus, for example, and is different from data bus system 108, and they may be connected to at least one control unit which is in turn connected to bidirectional bus system 108. In this embodiment, sensor 109 is an engine temperature sensor, and sensor 110 is an engine rpm sensor. No additional sensors involving the motor management system are shown here for reasons of simplicity. Likewise, actuator 117, e.g., an injection arrangement for fuel here, is representative of other actuators in a motor management system. Sensors 109, 110 as well as actuator 117 should be understood here as only representative. Different sensors and actuators will be used, depending on the type of motor, whether an electric motor or an internal combustion engine, and specifically whether it is a Otto engine with direct fuel injection or a diesel engine. Block 112 represents another system, e.g., a system which influences the braking action and/or increases driving stability or safety, such as an anti-lock system or a vehicle dynamics control system. For reasons of simplicity, all the actuators and sensors together with one or more controllers needed for this purpose are combined in the system in block 112. In addition, another system 113 is also shown, e.g. an automatic transmission control system or a system for fault diagnosis in the vehicle, supplying fault information in the form of error codes, for example, on data bus 108. However, in addition to systems and controllers, other components such as actuators or sensors, in particular intelligent sensors having signal processing and a logic unit on site, can be connected directly to the bus. Block 114 represents, for example, a sensor for detecting vehicle speed. Block 115 represents, for example, a starter or a starter generator. Likewise, other vehicle components 116 in the form of systems, controllers, actuators and sensors may optionally be connected to data bus 108, e.g., a vertical acceleration sensor for detecting vibrations in driving over potholes. Sensors for detecting environmental factors such as outside temperature, humidity, in particular a rain sensor, etc. are also possible. Data bus 108 may be connected over a gateway, e.g., optional component 116 to additional bus systems in the vehicle, e.g., sensor bus systems, i.e., a bus system linking the sensors in a network,.

In this example, the sensor may be an intelligent sensor having a microcontroller on site, its own AD conversion and its own signal preprocessing, so the sensor can directly transmit physical quantities as digital values onto bus 108, for example. In addition, such a sensor may also be accommodated on chip or in another system (109–111), using its signal processing and bus controller. Similarly, this also applies to actuators which in turn have their own bus access (115) or are connected (117) to a system (111). Connected vehicle components 111 through 116 differ in complexity and communicate with data bus 108 over a bus controller. A motor management system 111, a brake system 112, a transmission control or a fault diagnosis system 113, a starter 115 and a driving speed sensor or an rpm sensor 114 are also mentioned here as representatives of the variety of vehicle components that can be connected to the bus. Optional element 116 is shown as representative of additional components.

Data going from these components to the data bus or data that can be retrieved from these components over the data bus is also made available to memory medium 101 via its bus coupling and stored there. In a first embodiment, memory medium 101 has at least one memory 100 and bus coupling unit 100*b*, e.g., a microcontroller and an output unit 100*a* over which data can be retrieved from memory 100. Bus coupling unit 100*b* may have its own volatile or nonvolatile memory for data buffering, for example. Bus coupling unit 100*b* has a communications controller and a communications interface, in particular a dual port RAM. A host function could be implemented through the controller software, or the software in the memory medium, because processing of data already stored or to be stored can take place via a microcomputer or a microcontroller in the memory medium.

The arrangement according to the present invention for storing data in a vehicle thus includes a memory medium such as memory 100, which is provided for the vehicle and is connected at an interface in the vehicle to databus 108 for reading and/or writing. Memory 100 has a large memory volume or as an alternative it may be designed as a modular component (e.g., cascaded) made up by several smaller memory modules which can be configured through the corresponding software or switches, e.g., DIP switches, depending on use. In an advantageous variant, one or more of the nonvolatile memories present in one or more controllers may also be used in a software system as a distributed application as part of an embodiment. Data here is distributed among multiple memories in the controllers.

Usage or load profiles of the vehicle or its components can be reconstructed at any time by analyzing arrangements using data stored in memory 100 over the entire service life or lifetime of the vehicle. These are advantageously analyzing arrangements 102 through 104, but at least one analyzing arrangements is provided on memory medium 101 itself. Different interpretations of data from memory 100 are possible by analyzing arrangements 102 through 104. Results of such interpretations can be sent to external interfaces by way of an output unit 105. These may include, for example, a serial interface 106 and a parallel interface 107, e.g., to another bus. Instead of outputting the results obtained by data interpretation, the results may also be stored again in memory device 100 and may remain there. Data and results thus stored in data memory 100 on the whole will then remain there over the entire service life of the vehicle or the arrangement, so this provides a historical record of vehicle performance. If this arrangement is present in a vehicle from the beginning, it may include the entire lifetime of the vehicle. If there is a possibility of retrofitting such an arrangement in a vehicle and connecting it to data bus 108 which is already present there, then this history is available from the time of installation of the arrangement according to the present invention.

Figure 2:
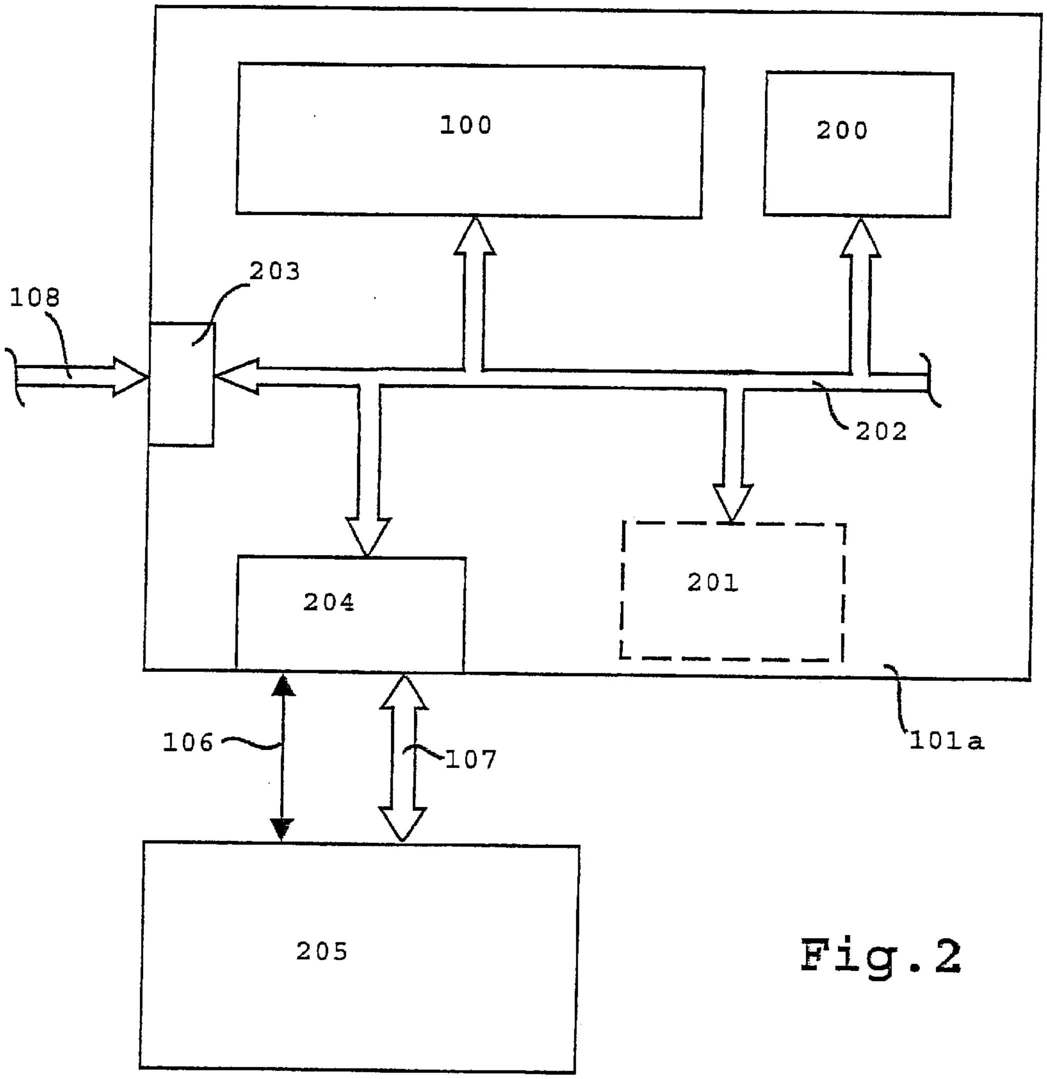
FIG. 2 shows another embodiment of the memory medium.

Another embodiment of memory medium 101 illustrated in FIG. 1 is shown in FIG. 2, where memory medium 101*a* is connected to data bus 108 of the vehicle via a coupling module 203. An internal bus 202 of memory medium 101 connects memory 100, a microprocessor 200, a peripheral input/output unit 204 and optionally other elements 201. Depending on the extent of function and the internal design such as possible memories, coprocessors, etc., various terms may be used to describe microprocessor 200 such as microcontroller, central processing unit, electronic control unit, etc. Peripheral input/output unit 204 establishes the connection of memory medium 101*a* to possible external devices and modules 205, either serially over interface 106 or in parallel over interface 107. Such external devices include, for example, test computers and analyzing computers or other vehicle components or sensors which are not connected to vehicle data bus 108. In principle, data on data bus 108 is entered into memory medium 101*a* through coupling module 203. Selection or preselection of certain data can take place in coupling module 203. However, further selection of data to be stored is possible through microprocessor 200 or an optional analyzing circuit, e.g., at the position of element 201. An overall system according to the present invention would thus include the hardware of the memory medium in the vehicle, an optional analyzing unit for data transmission from the on-board data memory and analyzing software or an analyzing circuit for classification, interpretation and visualization of data. On-board hardware would typically include a microprocessor or microcontroller 200 for data preprocessing and/or analysis, vehicle components (111–116) from which data is stored, in particular sensors for compiling operating data, at least one nonvolatile, large-volume data memory (100), an obligatory power supply, an interface in the form of a coupling unit (100*b*, 203) to the data bus of the vehicle and at least one communications interface (105, 203) for transmitting stored data to another computer, in particular a read-out device. The memory medium hardware in the vehicle is used for acquisition, preprocessing and storage of data needed for the use scenarios described above. Data analysis, in particular reconstruction of usage and/or load patterns, can be carried out to advantage through an optional analyzer circuit in the memory medium, and results thus obtained can be visualized for the driver of the vehicle as well as for the service or other individuals and organizations, for example. Memory medium (101 or 101*a*) uses the on-board data bus system such as CAN, information from other bus devices in the form of vehicle components such as an automatic transmission control system or an on-board diagnostic system (113), a motor management system (111), a brake system (112), a starter (115), an rpm sensor, air bag sensors, etc., can be detected and sent or transmitted to the memory medium either cyclically or per request or based on events. Data processed in the memory medium and analysis of such data permit simultaneous implementation of several use scenarios, as explained in the section on advantages. To do so, data interpretation systems are created for all use scenarios that are of interest. This may take place through internal or external analyzer circuits, or in the software. In the case of external circuits, data transmitted from the memory medium over the communications interface is received by a read-out device and then analyzed by a computer or by an external test unit. The memory unit also detects the operating states of other bus devices, such as the information "starter on," as well as their logging onto and off the bus system. This permits the replacement of a component to be documented, for example. It is also possible to store user profiles of drivers in the memory medium in conjunction with keyless entry systems. The vehicle components or the vehicle itself could then be adapted to each user's style, in particular the personal driving style.

Figure 3:
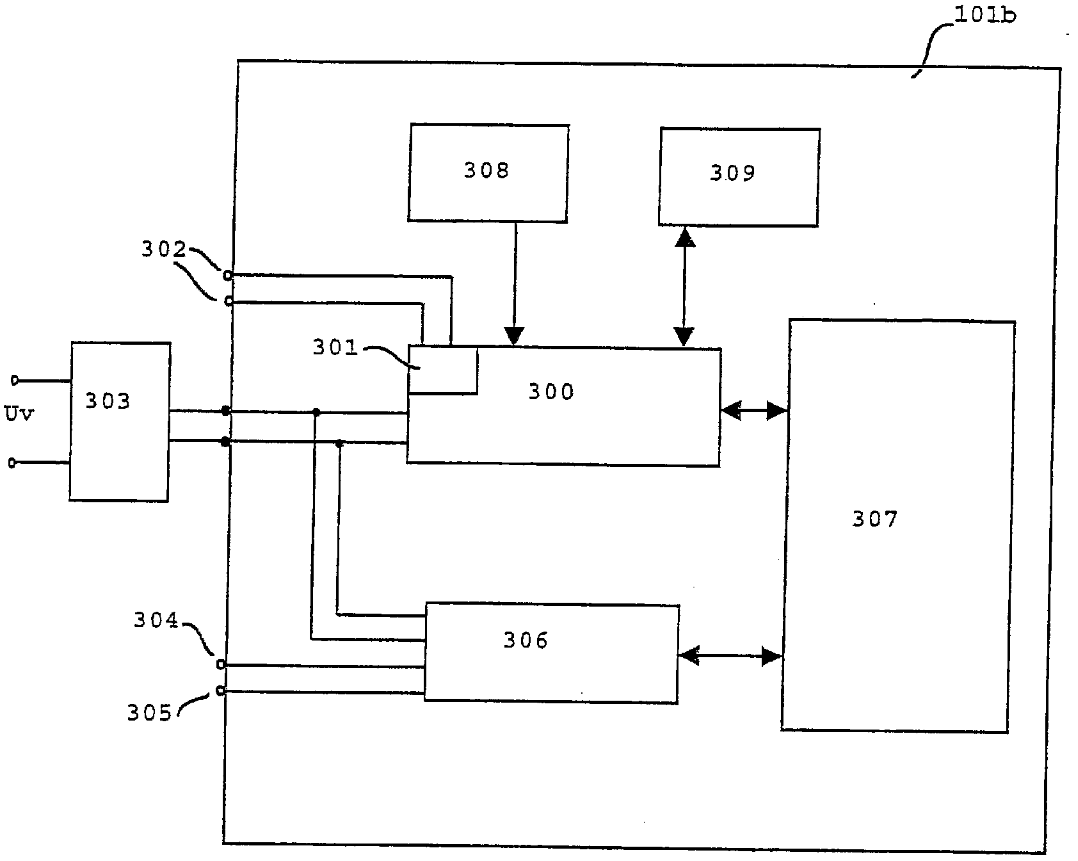
FIG. 3 shows a very special modular embodiment of a memory medium in the form of a usage chip, which may also be designed to be portable on a substrate.

One very special embodiment of the present invention is illustrated in FIG. 3 in the form of a usage chip 101*b*. A module which is separate from other automobile components and contains usage chip 101*b* then has access to all information transmitted over one or more data bus systems in the motor vehicle. Ideally, all relevant information would be available over the data bus. If this is not the case, external interfaces for components outside the data bus system may also be provided in the vehicle. The usage chip thus has a microprocessor 300 for data acquisition and analysis, having a write logic unit and a security logic unit as well as a coupling module 301 for a bus system in the form of data bus 108, for example, which is connected to pins 302. In addition, usage chip 101*b* contains an input and read-out unit 306 for acquisition of additional external data such as service or repair information over pin 304 and for the usage data, which may be displayed on an electronic driver's display via a special code or may be transmitted to a computer over a reader in a wireless operation (e.g., optical, inductive or by radio signal) or in a hardwired operation using a readout pin 305. Likewise, battery 308 is also provided as an additional power supply which is engaged when power supply 303 is out of service. A circuit 309, such as an RC oscillator, with the help of which a time base for measuring time can be generated, is optionally provided. The data memory in this specific embodiment is labeled as 307. It is designed as an EEPROM or a flash memory or some other nonvolatile memory. Microprocessor 300 is also used for analysis of information or data, e.g., to limit the required memory demand. On microprocessor 300 data or information is extracted and interpreted, and data is generated, in particular usage data describing the wear and load of a motor vehicle. The module in the form of usage chip 101*b* thus has at least one microprocessor 300, a nonvolatile data memory (307) and interfaces for communication with bus (302) and for read-out of data (304) from the data memory.

It is also conceivable to connect data memory 307 directly to the components needed for using this method, in particular sensors, and the data memory may also be connected to the on-board diagnostic system.

Microprocessor 300 as well as processors 200, 100*a* and 100*b* are also used to encode the calculated data. From the standpoint of data security, to prevent replacement of usage chip 101*b*, certain vehicle information such as the serial number may be stored on usage chip 101*b*. On the other hand, in the event of unauthorized removal or manipulation of usage chip 101*b*, data stored on it could be erased or rendered unidentifiable with the help of internal battery 308, depending on whether certain security barriers have been violated.

Usage chip 101*b* may either be installed in a vehicle component or designed as a separate module.

Various data can thus be stored in the aforementioned memory medium illustrated in FIGS. 1 through 3 so that the data can be analyzed. Examples of such data that can be stored together or alternatively in any desired combination are given below.

In addition to internal operating data on the individual components of the vehicle, i.e., vehicle systems for processing operating data such as the brake system, the drive system, the power transmission system, in particular transmissions, etc., external data is also stored. This external data is detected by sensors, for example, or determined from sensor quantities. Such data would include in particular such environmental conditions as the temperature, humidity, rainfall, fog density, wind speed, etc. Such environmental conditions can then also be combined further and analyzed. Such environmental data may also be recorded in the shutdown phases, i.e., when the vehicle is not in operation, to determine vehicle wear on the basis of its environment even when the vehicle is not in operation (e.g., rain, snow, cold, parking on a slope, use of the parking brake, etc.), and therefore conclusions regarding the overall service life of a vehicle can be drawn according to the present invention.

In addition, data concerning inspections and repairs may also be stored in this memory medium. Such data would concern in particular vehicle inspection intervals and/or repairs that have been made or are to be made on the vehicle including identification of individual components in this regard. Information on components that have been replaced. and/or are to be replaced could also be compiled and taken into account here. For a determination of the wear on the overall vehicle system, components that have been replaced or repaired and the time of their replacement or repair could be taken into account. An individual component identifier on the basis of which the respective component can be identified is then stored for this purpose. To do so, adjustment data, revised on the occasion of repairs or inspection or some other event, could also be stored together with the corresponding revision time. Such adjustment data is input or altered in the application of components or the vehicle as a whole. Likewise, this may take place in the event of retrofits or improvements or addition or removal of vehicle components. Such adjustment data would include, for example, variable or optimizable data in a vehicle controller.

Even faults that occur in operation or during inspections, in particular permanent faults, may be stored in the memory medium. Another type of data which can also be stored would include information on improper operation of the vehicle, such as accelerating too rapidly, extreme braking, gear shifting errors, etc.

As a result, user profiles can be stored in the memory medium, e.g., by recognizing a type of driver. Actual mistakes in operation are then derived from the tolerances with regard to operation by the respective type of driver. However, the type of driver per se, i.e., the user profile, could also be used in determining vehicle wear. For example, whether the vehicle is operated economically or in a sporty manner, etc., based on the operating data, would also play a role here. Loads on individual components or the vehicle as a whole can thus be determined, and data such as the number of starts, in particular cold starts, start-up acceleration, severity of steering actions, deceleration, e.g., due to braking or engine brake, axle loads due to weight may also be taken into account, even directly in some cases.

Through the present invention, it is also possible to document vehicle use over the entire service life of a vehicle, i.e., until it is finally scrapped. The duration and intensity of individual operating phases as well as periods during which the vehicle is stationary, during its service life until it is finally scrapped can also be stored and analyzed.

The present invention also relates to methods of determining wear or load on vehicles based on the aforementioned memory media 101, 101*a* and usage chip 101*b*. To illustrate a first method of determining the degree of wear AG, the engine temperature and engine rpm are determined as an example and as representative of other data and quantities. This is done, for example, by sensors 109 and 110. A number of engine rpm. N1, exceeding a predetermined threshold Nmax1, is determined for further processing. In addition, another number of engine rpm N2 exceeding a threshold value Nmax2, which is greater than Nmax1, may also be determined. This can be continued with any desired number of threshold values Nmaxi. In addition, an average engine rpm Nmittel may also be used. A similar procedure is also followed with regard to engine temperature. First, the number of engine temperatures T1 exceeding a threshold Tmax1 is determined. Likewise, a number of engine temperatures T2 exceeding another threshold Tmax2, which is greater than first threshold Tmax1, is also determined, for example. Here again, this can be performed for any desired number of threshold values. On the other hand, an engine temperature Tmittel obtained by averaging may also be used here. Instead of or in addition to the engine rpm and engine temperature, any conceivable vehicle parameter may also be used to form degree of wear AG. For example, vehicle speed, longitudinal and transverse acceleration, vertical acceleration, outside temperature, humidity of the outside air, braking force, etc. may also be used as parameters here, with the number of times certain threshold values are exceeded being determined and averages being formed. Likewise, at least a number of steering actions, cold and warm starts, etc., can be introduced and averaged according to the above principle. In a very simple form, degree of wear AG is then obtained as follows:

$$AG=a1*N1+a2*N2+a3*T1+a4*T4+ \dots G1 \quad (1)$$

Using the averaged quantities, equation 1 becomes:

$$AG=a1*N1+a2*N2+a5*N\text{mittel}++a3*T1+a4*T2+a6*T\text{mittel}+ \dots G1 \quad (2)$$

Weighting factors al through a6, i.e., ai, which may be constant or dynamically adjustable when using other data and/or additional data, are quantities to be defined for a specific application and may optionally be adjusted dynamically. A value for degree of wear AG may then be obtained automatically, e.g., from a table or an engine characteristic map, and assigned to a residual value of the vehicle, as well as to the remaining lifetime of the vehicle, its subsystems and components, for example. This information may be displayed automatically, depending on authorization,. e.g., as a display in the vehicle for the owner or the driver or relayed by wireless connection to some other person or organization. The parameters relevant for the determination of the degree of wear may be determined by test series before first introduction to the market and from empirical values from the operating A phase. On introduction of a new vehicle model, manufacturer's information is usually available from test series, so the starting values for the degree of wear are adjusted during the entire life cycle of the vehicle or its service phase. To do so, weighting factors al through a6, i.e., ai are adapted to the prevailing situation or status by retrieving data regarding the vehicle service and correlating this information with repair data. The degree of wear may either be calculated on a microprocessor in the vehicle or determined on the basis of an external device or computer.

In addition to such quantities as engine rpm and engine temperature used here, it is also conceivable to use a variety of other quantities to determine objective wear. This would include, for example, the number of engine starts, in which case it is possible to determine whether it is a cold or warm start, for example, depending on engine temperature, as well as to determine the vehicle speed, the braking force, the braking time, the transverse acceleration, the vertical acceleration, e.g., to detect vibration when driving over potholes, etc.

Figure 4:
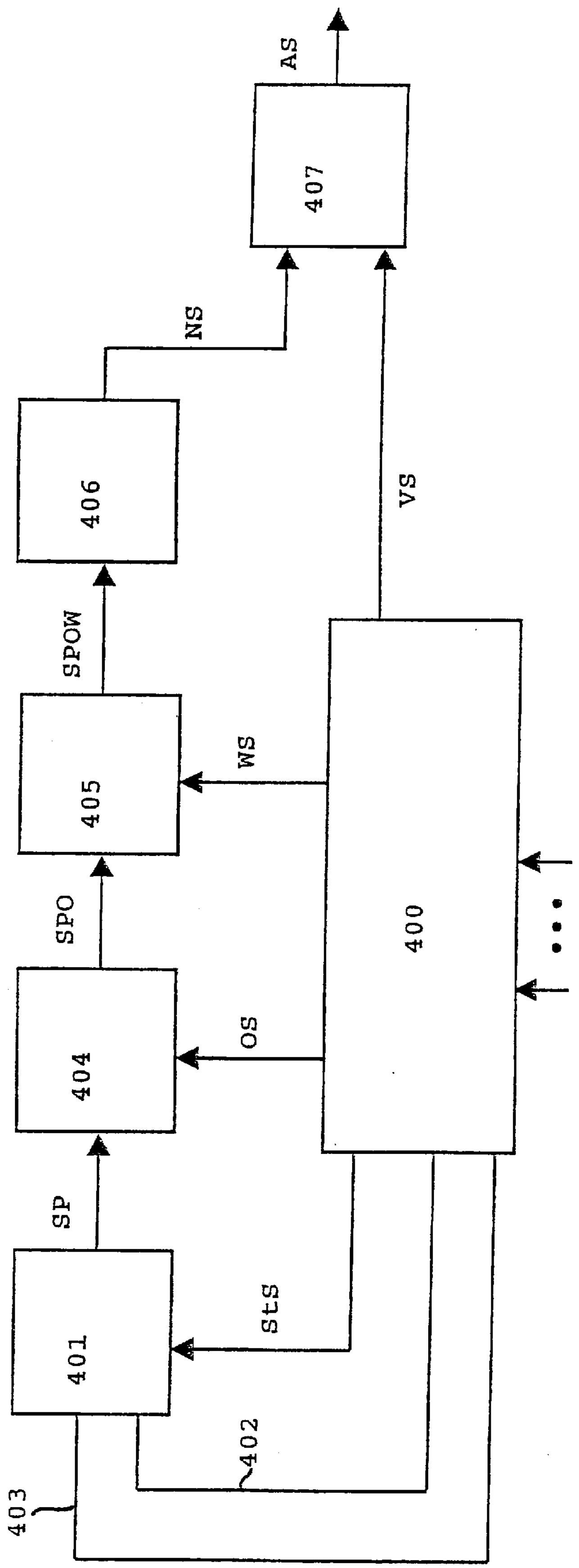
FIG. 4 illustrates one possible method in the form of hardware or software for determining wear in the form of a degree of wear or for determining service life.

A more complex type of analysis in comparison with the example given above is shown in FIG. 4. The central unit here includes at least one memory medium of the type mentioned above plus the data bus, but it may also include a control unit. Central control unit or central unit 400 supplies various input data for an interpretation arrangements 401 over lines 402 and 403. In the simplest case, a low level is applied to line 403 and a high level to line 402, and interpretation means arrangement is designed as a simple switching arrangement. When operation of the vehicle or an on-board component is begun, as relayed by control signal StS to interpretation arrangement 401, then interpretation arrangement 401 as a switching arrangement switches from the low level on line 403 to the high level on line 402, thus rendering a downstream circuit functional, for example. If the low level on line 403 is at zero, then a definitely higher wear is determined only in the case of operation of the vehicle or an individual component and thus an applied high level. If interpretation element 401 is not set to the operating mode (high level) by control signal StS, it is also possible to prevent an offset signal OS or a weighting signal WS from being output, so there can be a contribution to the degree of wear only if the vehicle or the component is actually operated. In element 404, an offset signal OS is switched to the output, signal level SP of element 401. In the simplest case, offset signal OS is simply added. Quantity SPO, to which offset signal OS is applied, is then provided with a weighting, i.e., a weighting signal WS in element 405. Again in the simplest case, weighting signal WS is simply multiplied as a factor. Weighting signal WS and/or offset signal OS are formed from input signals ES of central unit 400. These input signals ES correspond to the data to be stored in the memory medium and analyzed. Thus, the memory medium is contained in central unit 400. Quantity SPOW, to which weighting signal WS and offset signal OS are applied, is then sent to an integrating element 406. Quantities SPOW, which arrive in succession and to which offset signal OS and weighting signal WS have been applied, are integrated in this integrating element 406. This yields at the output of the integrator a quantity which corresponds to the usage or a use time, a usage signal NS. Element 407 then functions as a comparator element. In addition to quantity NS which describes the usage and comes from integrating element 406, a comparison signal VS is sent to comparator element 407. This comparison signal VS having a threshold function can, if exceeded, be used to initiate an exchange or replacement of at least one component, to shorten service intervals or perform repairs. This is indicated by output quantity, i.e., output signal AS of comparator element 407. This quantity AS may be displayed on a driver's display for the driver of the vehicle or relayed via wireless transmission to a workshop or a fleet manager. The sequence illustrated in FIG. 4 may also be implemented completely in the software. It is also possible to provide such a system for each vehicle component or at least for a selection of components. In this way it is possible to determine the degree of usage or performance for each component and for the vehicle as a whole when combined. For example, offset OS would correspond to the number of starts in the case of starter 115, and the engine temperature, for example, would enter into the weighting WS. This would permit a more precise correlation between starting and engine temperature than is possible by merely differentiating cold starts vs. warm starts, for example, in comparison with the preceding method. In the case of an electronic gas actuator, for example, offset OS would correspond to the alternating loads and engine temperature would also enter here through weighting signal WS. In the case of vehicle brakes, for example, offset signal OS would occur in the event of a braking intervention, and weighting signal WS would reflect the braking torque. The same thing could also apply to engine fan, spark plugs, vehicle engine, clutch and transmission, fuel injector, etc. Environmental conditions could also enter into on-board quantities as weighting factors. For example, the lifetime of a vehicle is shortened by driving constantly at a low temperature or on bad roads, or also by frequent cornering. For detection of frequent cornering, either the steering angle setting or a navigation system from which the routes traveled could be identified can be analyzed. Frequent driving in rain when road surfaces are wet and slushy could also increase vehicle corrosion and thus shorten the total lifetime.

The present invention permits simpler handling of warranty claims or insurance claims as well as protection against manipulation, e.g., installation and operation of the wrong components or use of the wrong data, in particular adjustment data. Furthermore, the history of an automobile is available at any time in this way.

What is claimed is:

1. A device for storing data in a vehicle, the data being transmitted in the vehicle over a data bus to which components are capable of being connected, the device comprising:

a central memory medium connected to the data bus and for the components connected to the data bus, wherein: the data is dynamic and is permanently stored in the central memory medium for an entire service life of the vehicle; and an analyzing arrangement capable of being connected to the memory medium and for interpreting the data to form a measure of at least one of a use of the vehicle, a wear of the vehicle, a use of the components, and a wear of the components.

2. The device according to claim 1, wherein:

the components include a sensor and an actuator.

3. The device according to claims 1, wherein:

the components respectively include at least one memory for storing the data.

4. The device according to claims 3, wherein:

the components that respectively include at least one memory correspond to controllers.

5. The device according to claim 1, wherein:

the central memory medium stores data relating to at least one of an inspection interval, a repair that at least one of has been and is to be performed, and a component that at least one of has been and is to be replaced.

6. The device according to claim 5, wherein:

the data relating to the component that at least one of has been replaced and is to be replaced corresponds to a component identifier.

7. The device according to claim 1, wherein:

the central memory medium stores at least one of a user profile, data on one of a fault and an improper operation, and a change in adjustment data.

8. The device according to claim 1, wherein:

the central memory medium stores at least one of internal operating data on the vehicle and external data corresponding to an environmental condition.

9. The device according to claim 1, wherein the central memory medium includes:

a nonvolatile memory, a bus coupling unit, and an input/output unit.

10. A storage medium for storing data in a vehicle that includes components, comprising:

a nonvolatile memory;

an input/output unit;

an analyzing arrangement for analyzing the data in order to form from the data a measure of at least one of a use of the vehicle, a wear of the vehicle, a use of the components, and a wear of the components; and a bus coupling circuit over which the storage medium is connected to a data bus in the vehicle, the data being entered into the storage medium over the data bus over an entire use period of the vehicle;

wherein the data is dynamic.

11. The storage medium according to claim 10, wherein:

the components respectively include at least one memory for storing data.

12. The storage medium according to claim 11, wherein:

the components that respectively include at least one memory correspond to controllers.

13. The storage medium according to claim 10, wherein:

the nonvolatile memory stores data relating to at least one of an inspection interval, a repair that at least one of has been and is to be performed, and a component that at least one of has been and is to be replaced.

14. The storage medium according to claims 13, wherein:

the data relating to the component that at least one has been replaced and is to be replaced corresponds to a component identifier.

15. The storage medium according to claim 10, wherein:

the nonvolatile memory stores at least one of a user profile, data on one of a fault and an improper operation, and a change in adjustment data.

16. The storage medium according to claim 10, wherein:

the nonvolatile memory stores at least one of internal operating data on the vehicle and external data corresponding to an environmental condition.

17. A method of storing and analyzing data in a vehicle, comprising the steps of:

causing the data to be transmitted over a data bus and to be entered into a memory medium, the memory medium including a central memory and being connected over a data bus to another component in the vehicle;

maintaining the data stored for an entire service life of the vehicle; and analyzing the data to form from the data a measure of at least one of a wear of the vehicle, a usage of the vehicle, a use of the other component, and a wear of the other component;

wherein the data is dynamic.

18. The method according to claimed 17, wherein:

the step of analyzing is performed by an analyzing arrangement.

19. The method according to claim 17, wherein:

the step of analyzing is performed by forming a degree of wear as a sum of at least one of weighted occurrences of exceeding threshold values that can be predefined for selected data types and weighted averages of the selected data types.

20. The method according to claim 17, wherein:

the step of analyzing is performed by forming a value representing at least one of a preceding service life and an intensity of use of the vehicle, the value being formed by applying at least one of a weighting and an offset to at least one signal and then forming a sum, with at least one of the weighting and the offset being formed from the data of the analysis.

21. The method according to claims 20, wherein:

the sum is formed by integration.

22. The method according to claim 17, wherein the memory medium stores at least one of:

internal operating data of the vehicle, external data pertaining to an environmental condition, data regarding at least one of an inspection interval and a repair that at least one of has been and is to be performed, data regarding a component that at least one of has been and is to be replaced, and data regarding at least one of an error, a faulty operation, and a change in adjustment data.

23. A device, comprising:

a data bus connectable to at least one vehicular component and for transmitting data;

a memory connected to the data bus and for storing data from the at least one vehicular component, the data being dynamic and permanently stored for an entire service life of the vehicle; and an analyzing arrangement capable of being connected to the memory and for interpreting the data to form a measure of at least one of a use of the vehicle, a wear of the vehicle, a use of the components, and a wear of the components.

24. A method of storing and analyzing data in a vehicle, comprising:

transmitting the data over a data bus;

entering the data into a memory medium, the memory medium including a central memory and being connected over the data bus to a component in the vehicle;

storing the data for an entire service life of the vehicle; and analyzing the data to form a measure of at least one of a wear of the vehicle, a usage of the vehicle, a use of the component, and a wear of the component;

wherein the data is dynamic.

* * * * *